United States Patent
Wielgosch (10) Patent No.: US 9,924,641 B2
(45) Date of Patent: Mar. 27, 2018

(54) PLANT SUPPORT

(71) Applicant: Uwe Wielgosch, Grossheirath (DE)

(72) Inventor: Norbert Wielgosch, Meeder (DE)

(73) Assignee: Uwe Wielgosch, Großheirath (DE)

( * ) Notice: Subject to any disclaimer, the term of this patent is extended or adjusted under 35 U.S.C. 154(b) by 294 days.

(21) Appl. No.: 14/712,979

(22) Filed: May 15, 2015

(65) Prior Publication Data

US 2015/0366148 A1    Dec. 24, 2015

Related U.S. Application Data

(60) Provisional application No. 62/015,448, filed on Jun. 22, 2014.

(51) Int. Cl.
| | | |
|---|---|---|
| *A01G 17/14* | (2006.01) | |
| *A01G 17/06* | (2006.01) | |
| *A01G 17/04* | (2006.01) | |
| *A01G 9/12* | (2006.01) | |

(52) U.S. Cl.
CPC .............. *A01G 17/04* (2013.01); *A01G 9/12* (2013.01)

(58) Field of Classification Search
USPC ............................ 47/47, 44, 45, 70; 248/27.8
See application file for complete search history.

(56) References Cited

U.S. PATENT DOCUMENTS

| | | | | |
|---|---|---|---|---|
| 538,878 A | * | 5/1895 | Mills ........................ | A01G 9/12 256/46 |
| 565,540 A | * | 8/1896 | Horan ...................... | A01G 9/12 47/45 |
| 603,754 A | * | 5/1898 | Baldwin ................... | A01G 9/12 47/47 |
| 754,542 A | * | 3/1904 | Chessman ................ | A01G 9/12 47/47 |
| 915,146 A | * | 3/1909 | Woerner ................... | A01G 9/12 47/47 |

(Continued)

FOREIGN PATENT DOCUMENTS

| | | | | |
|---|---|---|---|---|
| GB | 426141 | * | 10/1934 | ............. A01G 9/124 |
| GB | 536287 | | 5/1941 | |

(Continued)

OTHER PUBLICATIONS

For the love of a house, Whiskey Barrel Orb—the tutorial, Aug. 17, 2012, retrieved from internet Jan. 22, 2018 http://fortheloveofahouse.blogspot.com/2012/08/whiskey-barrel-orb-tutorial.html.*

(Continued)

*Primary Examiner* — Andrea Valenti
(74) *Attorney, Agent, or Firm* — Smartpat PLC (57) ABSTRACT

A plant support comprises two or more vertically elongated closed looped members which are rotationally spaced around a common vertical axis and connected to each other at the upper end and the lower end of the plant support. The plant support comprises an above-ground section and a relatively shorter in-ground section which is inserted into a planting hole or plant pot before soil is added and a plant is placed inside the plant support. The vertically elongated closed looped members are made of a rigid band material, such as e.g. stainless steel band having a width which is significantly wider than the band is thick.

10 Claims, 11 Drawing Sheets

(56) References Cited

U.S. PATENT DOCUMENTS

| | | | | |
|---|---|---|---|---|
| 917,655 | A * | 4/1909 | Pittman et al. | A01G 9/12 248/121 |
| 941,448 | A * | 11/1909 | Haglund | |
| 1,127,530 | A * | 2/1915 | Setchell | A01G 9/12 47/47 |
| 2,014,175 | A * | 9/1935 | Hart | A01G 13/043 47/20.1 |
| 2,181,016 | A * | 11/1939 | Gross | A01G 13/04 135/138 |
| 4,839,987 | A * | 6/1989 | Cosandier | A01G 9/124 248/213.2 |
| 4,993,184 | A * | 2/1991 | Howe | A01G 9/12 47/4 |
| D359,929 | S * | 7/1995 | Thornhill | 47/29.1 |
| 6,009,680 | A * | 1/2000 | Mathews | A01G 9/12 47/45 |
| 6,349,502 | B1 | 2/2002 | Fernandez | |
| 7,984,585 | B1 | 7/2011 | Wu | |
| 8,196,344 | B1 * | 6/2012 | Roberts | A01G 9/12 47/25.1 |
| 8,272,160 | B1 * | 9/2012 | Hamann | A01G 17/04 47/45 |
| 2004/0216372 | A1 * | 11/2004 | Voogt | A01G 9/124 47/39 |
| 2005/0097817 | A1 * | 5/2005 | Telles | A47G 7/047 47/67 |
| 2010/0101144 | A1 * | 4/2010 | Kurtz | A01G 9/12 47/66.7 |
| 2012/0017502 | A1 * | 1/2012 | Woehler | A01G 9/12 47/45 |
| 2013/0008083 | A1 | 1/2013 | Weder et al. | |
| 2013/0014433 | A1 * | 1/2013 | Pratt | A01G 9/12 47/30 |

FOREIGN PATENT DOCUMENTS

| | | | |
|---|---|---|---|
| GB | 2349325 | * 11/2000 | A01G 9/12 |
| NL | 2001327 C2 | * 2/2008 | A01G 9/12 |
| WO | 2011067575 A1 | 6/2011 | |

OTHER PUBLICATIONS

The French Blue Cottage, Feb. 25, 2014 by Carrie, DIY "Metal" Garden Spheres, retrieved from internet Jan. 22, 2018, https://frenchbluecottage.com/diy-metal-garden-spheres/.*

* cited by examiner

PLANT SUPPORT

TECHNICAL FIELD

The present invention generally relates to plant supports. In particular, the present invention relates to plant supports having a substantially U-shaped below-ground portion.

BACKGROUND

Plant supports are generally well known in the art. Typical prior art plant supports include a plurality of vertical members and a plurality of horizontal members. The vertical members have opposite top and bottom ends. The vertical member bottom ends are adapted to be inserted into the soil to thereby anchor the plant support to the earth and enable the plant support to support a plant. Some prior art plant supports have vertical members with pointed or sharpened bottom ends to facilitate the insertion of the vertical members into the soil. Typically, the horizontal members are attached to each vertical member and are arranged so that the horizontal members are vertically spaced along the length of the vertical members. The major drawback of the prior art plant supports is that they are designed to be pushed into the soil after planting, and thus to not provide reliable anchoring in the ground.

In preparing to use the prior art plant supports, a user positions the plant support over the plant to be supported and inserts the vertical member bottom ends into the soil. U.S. Pat. No. 6,349,502 discloses a prior art cage for supporting vegetable plants in a garden that can be inserted into the soil without deforming. A horizontal bottom member is provided to be stepped on so that the bottom horizontal member and lower sections of the vertical members engage with the earth and anchor the plant support in the soil. Consequently, the prior art plant support cannot be easily used for potted plants, as stepping onto a plant support in an elevated pot is inconvenient, if not impossible.

Both the horizontal members and the vertical members of prior art plant supports are typically made of wire or rods having a circular cross section. The horizontal members of the prior are plant supports are typically round hoops with a large central opening through which the plant may grow. However, some prior art plant supports utilize straight horizontal members. Prior art plant supports that use straight horizontal members are configured to allow a plant to be tied to the horizontal members by rope, twine, string or the like and are similar in nature to the aforesaid posts.

The more common, hoop type horizontal members typically have hoops that increase in diameter as the horizontal members are arranged from the bottom of the plant support to the top of the plant support. The increasing diameter hoops also have an associated increase in their central openings. These types of plant supports are positioned on top of a plant and allow a plant to grow upwardly through the central openings in the horizontal members. The horizontal members thereby provide support for the branches of the plant at various levels and allow for the plant to increase in diameter as the plant grows upwardly. These prior art plant support horizontal members are made of the same flexible and easily bent material as the vertical members. Therefore, the horizontal members also have the tendency to deform during the insertion of the plant support into the soil.

Because the typical prior art plant supports utilize a flexible and easily bent material, the durability of these plant supports is low and the plant supports are typically used only for a few growing seasons. Because the vertical members are so flexible, the user usually cannot insert a vertical member into the soil to the desired depth in a single action without bending or distorting the other vertical members. Additionally, the flexible nature of the prior art plant supports require the user to bend over or sit on the ground to grasp each vertical member near the bottom end to insert the vertical members into the soil.

SUMMARY

A plant support is disclosed which comprises two or more vertically elongated looped members made of a band material. The two or more vertically elongated looped members are connected to each other at a lower end and at an upper end of the plant support. A lower portion of the plant support is embedded in soil and an upper portion of the plan support extends above the soil. The two or more vertically elongated looped members may be made of stainless steel.

The two or more vertically elongated looped members of the plant support may be rotatably connected to each other at the lower end and at the upper end of the plant support so that the two or more vertically elongated looped members can be rotated into a common plane for storage and can be rotated into separate planes for use.

The plant support may further comprise one or more horizontal looped members, which may preferably have a generally circular shape of the same or a different diameter. For example, the plant support may comprise an upper and a lower horizontal looped member, and the diameter of the upper horizontal looped members may be smaller than the diameter of the lower horizontal looped member.

In an alternative embodiment a plant support, comprises at least two vertical support members, each of the vertical support members having a lower end and an upper end. The vertical support members are connected to each other at their lower ends and may also be connected to each other at their upper ends. The vertical support members may form a vertical loop. The vertical support members are preferably made of a band material having a width that that is more than 10 times its thickness, and may for example be made of steel.

The plant support may further comprise at least one horizontal support member that is connected to each of the vertical support members. The horizontal support members may have a generally circular shape. The plant support may comprise two or more horizontal support members, each having a generally circular shape of the same diameter and be connected to each of the vertical support members. The plant support may further comprise a protective device arranged at an upper end of the plan support.

Various shapes of the plant support are possible. For example, the plant support may be substantially tear drop shaped. In that case the plant support may comprise two vertical support members are made from a single piece of band material that is folded at the upper end of the plant support. A different shape may be obtained by forming the upper ends of the vertical support members as outward facing loops.

The plant support may be used within a system for supporting a plant in a pot. In that case the vertical support members may be elastically deformed and push against an inner wall of the pot. The plant is arranged in soil between the at least two vertical support members and the lower ends of the at least two vertical support members are arranged in the soil below the plant.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

Figure 1:
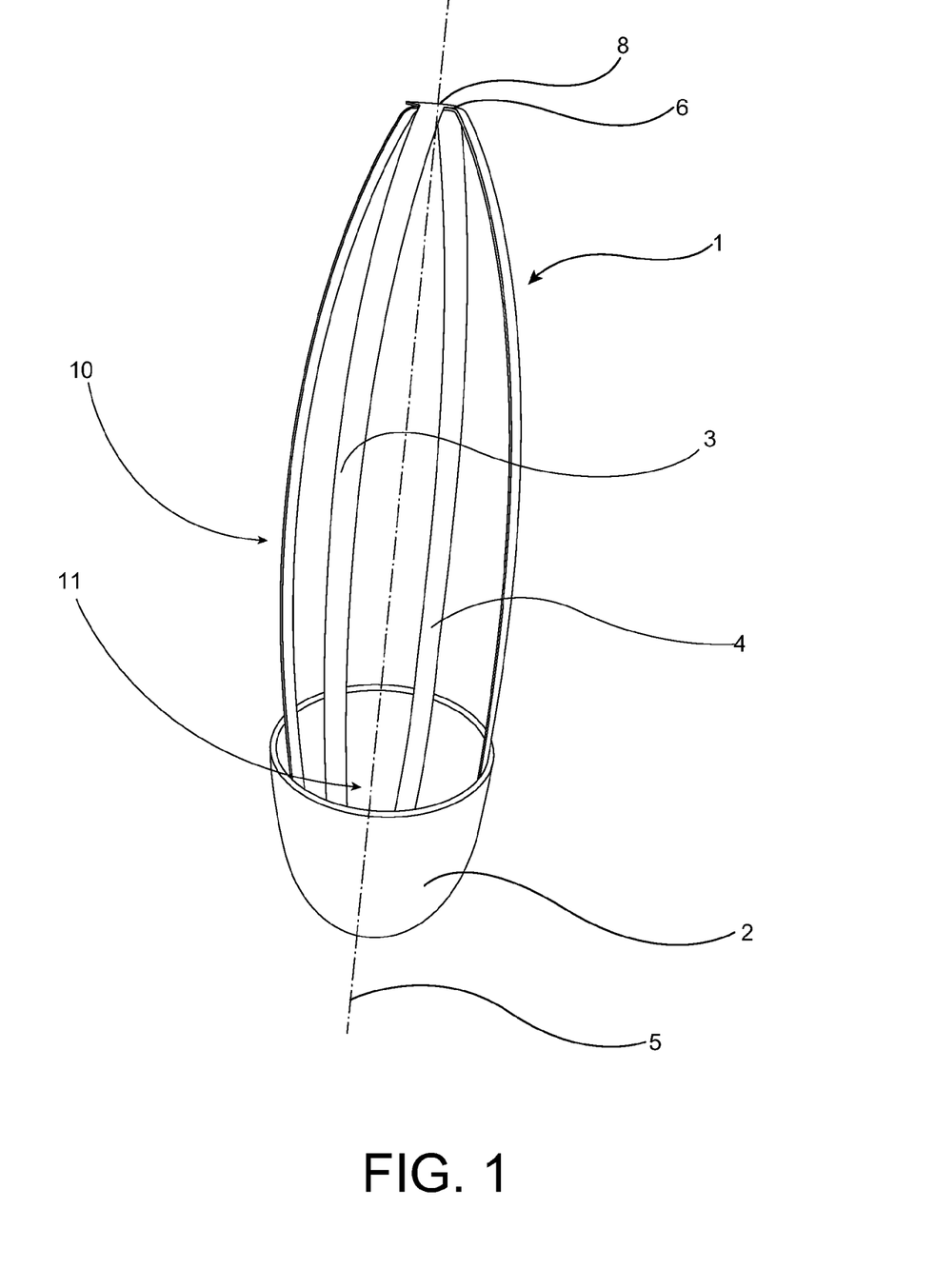
FIG. 1 shows a side view of an exemplary plant support in a plant pot.
Figure 2:
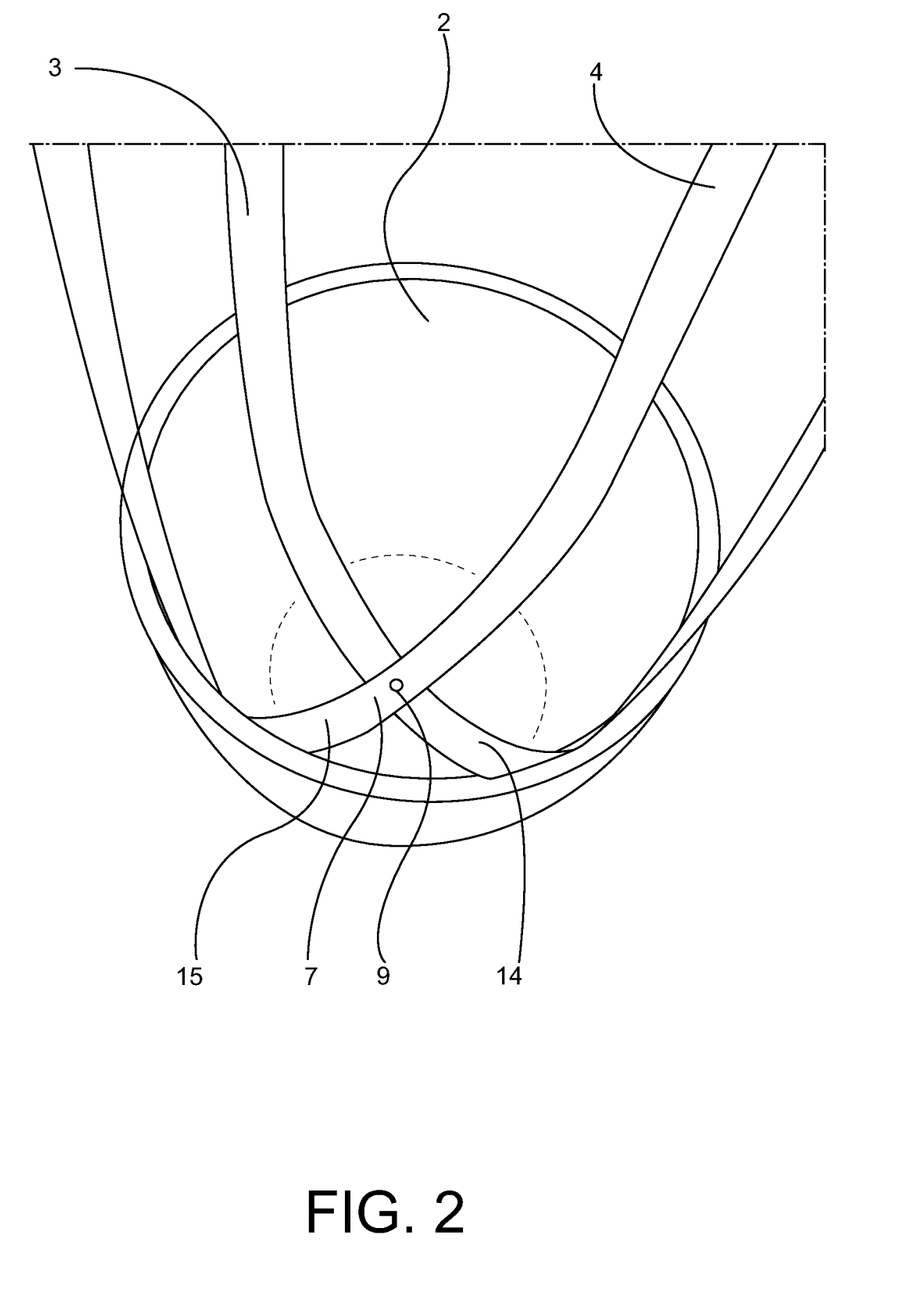
FIG. 2 shows the lower end of the plant support as in FIG. 1.

Referring to FIG. 1 and FIG. 2, an exemplary plant support 1 is shown. The plant support 1 comprises a first vertically elongated looped member 3 and a second vertically elongated looped member 4. Each vertically elongated looped member 3, 4 forms two oppositely arranged vertical support members. The first looped member 3 and the second looped member 4 are made of band material having a substantially rectangular cross section. The first looped member 3 and the second looped member 4 are coaxially arranged around a common vertical axis 5. In use, the first looped member 3 and the second looped member 4 are arranged in vertical planes which are oriented substantially perpendicular to each other and intersect along the common vertical axis 5. The plant support 1 extends vertically from an upper end 6 to and lower end 7. The first looped member 3 and the second looped member 4 intersect and are connected to each other at upper end 6 and at the lower end 7 of the plant support 1. At the upper end 6 the first looped member 3 is connected to the second looped member 4 by an upper connecting element 8. Similarly, at the lower end 7 the first looped member 3 is connected to the second looped member 4 by a lower connecting element 9. The connecting elements 8, 9 may for example be screws or rivets. The connecting elements 8, 9 may allow the first looped member 3 and the second looped member 4 to rotate relative to each other around their common axis 5. The plant support 1 may be stored with the first looped member 3 and the second looped member 4 rotated into a common plane, thus minimizing the storage space of the plant support 1 when not in use. Alternatively, the first looped member 3 and the second looped member 4 may be permanently connected to each other at the upper end 6 and/or the lower end 7 of the plant support, e.g. by welding or gluing, thus eliminating the need for one or both of the upper connecting elements 8 and the lower connecting element 9.

In preparation for use the plant support 1 is inserted into a pot 2 or an excavated hole in the ground before planting. The plant support 1 comprises an upper above-ground section 10 and a lower in-ground section 11. The pot 2 or hole is filled with soil 12, so that the in-ground section 11 of the plant support is securely anchored in the ground. A plant 13 is placed inside the plant support 1. The lower section 11 of the plant support 1 may be shaped to correspond to the inner shape of a planting pot 2.

The first looped member 3 and the second looped member 4 may be made of stainless steel band, for example made of coiled stainless steel band that has been bent into an infinite elongated loop. The stainless steel band may have a width of 1-5 cm and a thickness of 0.5 mm to 2 mm. The first looped member 3 and the second looped member 4 are made of band material having a width that is significantly larger than its thickness, e.g. having a width to thickness ration of between 5 and 100, and more preferably between 10 and 30. While the looped members 3, 4 may be made of stainless steel, other materials that provide sufficient strength and weather resistance may be used. In particular, the looped members 3, 4 may also be made of AHS steel. The person skilled in the art recognizes, that the members of the plant support may also have different profiles like solid or tubular bar of any profile like circular, oval or polygonal and may consist of other materials like wood, rattan, bamboo, plastics, compound material, composite material or the like.

As shown in FIG. 2, the in-ground portion 14 of the first looped member 3 and the in-ground portion 15 of the second looped member 4 may be substantially U-shaped. Alternatively, the in-ground portion of the looped members may be bent with a tighter radius, forming a more pronounced horizontal lower end of the plant support 1. In that case, the looped members comprise a more clearly defined vertical section and a horizontal section below ground.

The plant support 1 may have a height from its upper end 6 to its lower end 7 of up to 1 m and a horizontal distance between opposite vertical sections of the looped members 3, 4 of up to 30 cm.

Figure 3:
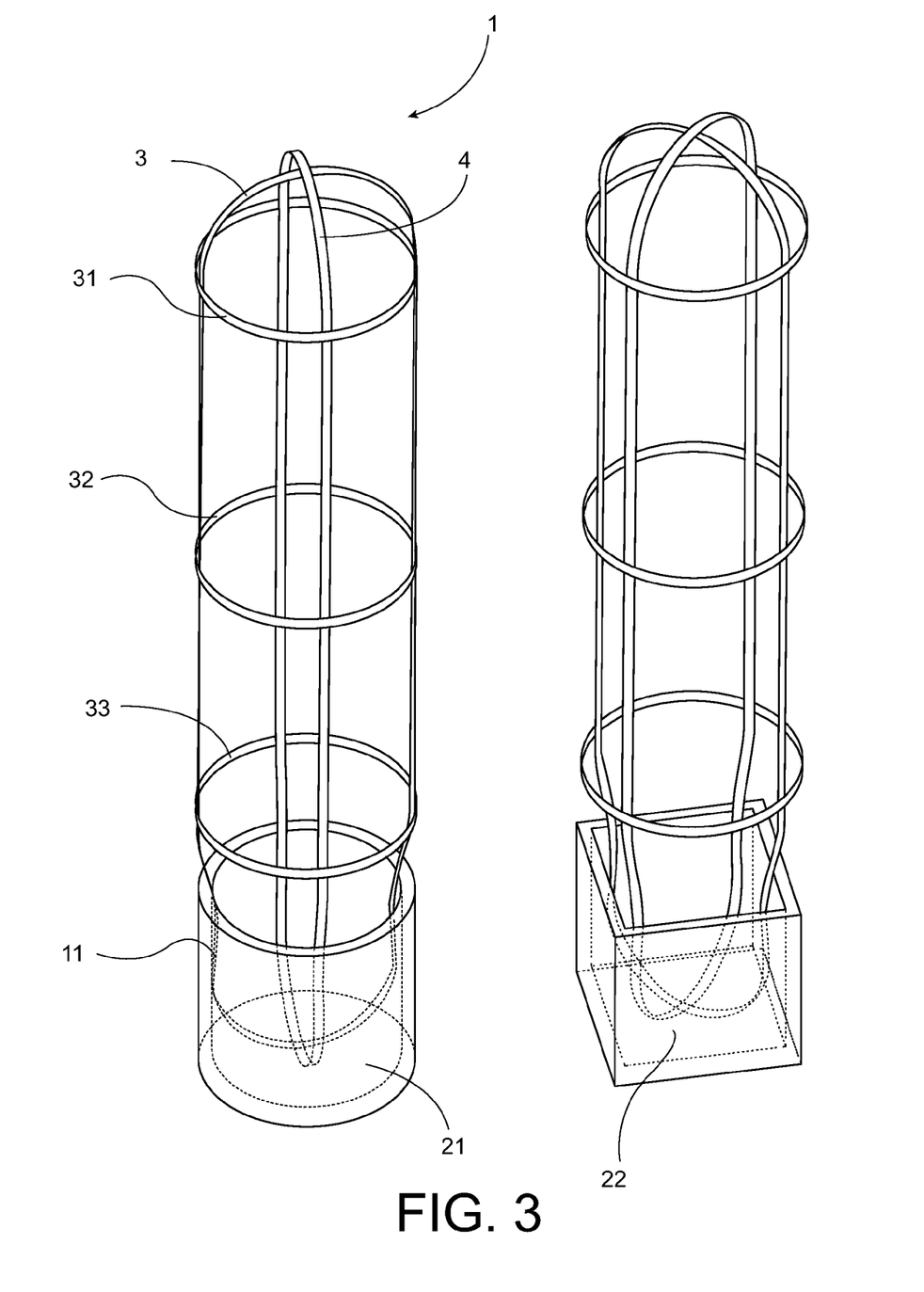
FIG. 3 shows an alternative plant support with horizontal support members in two different plant pots.

As illustrated in FIG. 3, a larger plant supports 1 can be built by using horizontal looped members 31, 32, 33 which connect to the vertically elongated looped members 3, 4. The plant support 1 comprises vertical looped members 3, 4 and horizontal looped members 31, 32, 33. The horizontal looped members 31, 32, 33 are attached to the vertical looped members 3, 4 along the length of the vertical members 3, 4. The looped horizontal members 31, 32, 33 may have a generally circular shape with a constant diameter. Consequently, the vertical looped members 3, 4 are arranged substantially in parallel between the horizontal members 31, 32, 33. An in ground section 11 of the plant support 1 is located below the lowest looped horizontal member 33 and adapted to be inserted into a plant pot 21, 22. The vertical looped members 3, 4 are made of a band material such as stainless steel band. The use of band material provides flexibility of the in-ground section 11 of the plant support 1 such that the looped ends can be compressed and adjust to different plant pots 21, 22. As shown, the same plant support 1 can thus e.g. be used with both a round plant pot 21 and a square plant pot 22. The plant support 1 easily adjusts to plant pots or planting holes of different diameters without compromising strength.

Figure 4:
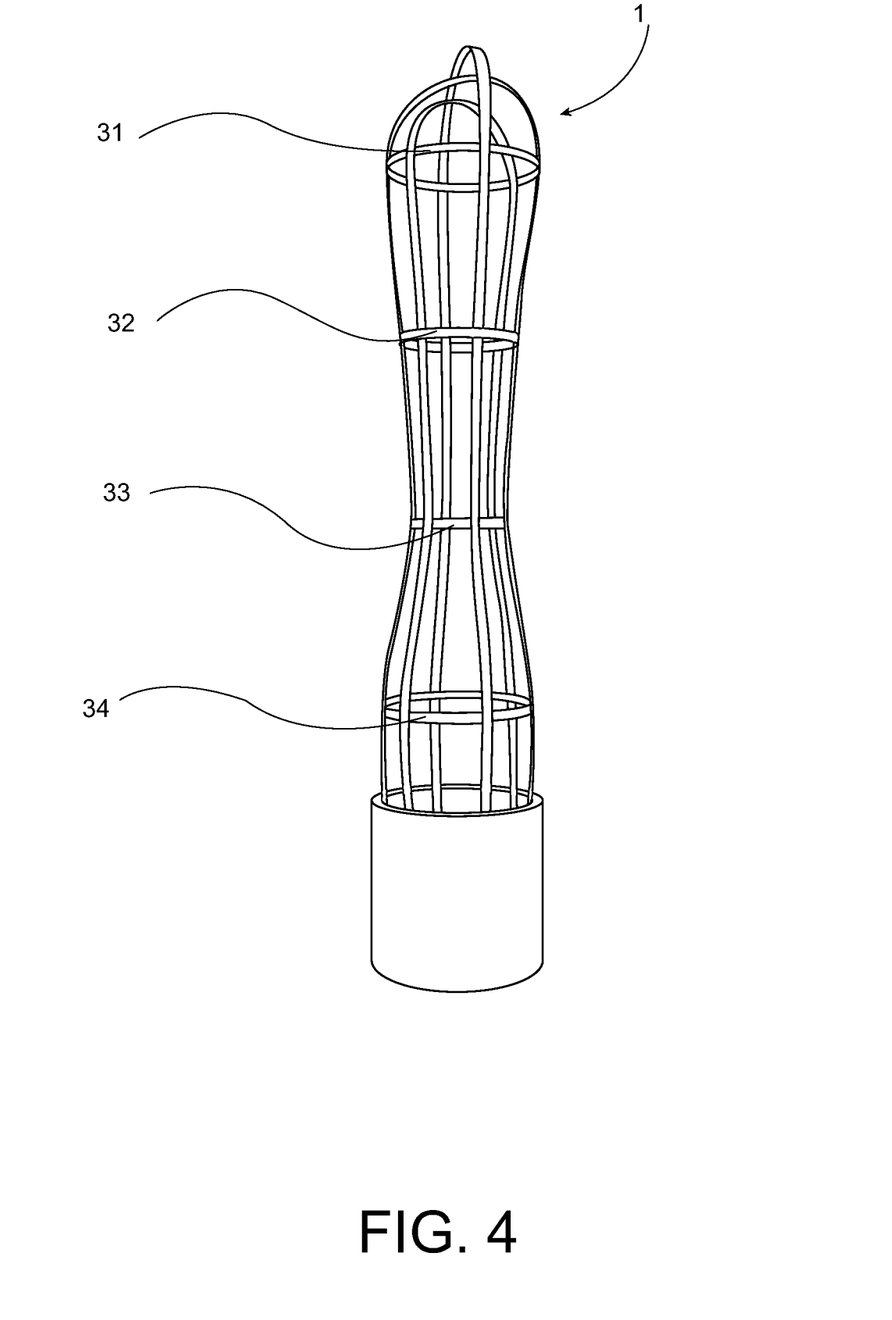
FIG. 4 shows an exemplary plant support with horizontal support members of different diameters.

Referring now to FIG. 4, it is shown that horizontal looped members 31, 32, 33, 34 need not be of the same diameter. Instead, various outer shapes of a plant support 1 can be achieved by using horizontal looped members 31, 32, 33, 34 of varying diameters. The horizontal looped members 31, 32, 33, 34 have a generally circular shape. The diameter of an upper horizontal looped member 33 may be smaller than a diameter of the lower horizontal looped member 34 arranged below. The horizontal looped member 32 may be arranged on the outside of the plant support 1, i.e. radially outwardly of the vertical looped members. The horizontal looped member 33 may also be arranged on the inside of the plant support 1, i.e. radially inwardly of the vertical looped members.

Figure 8:
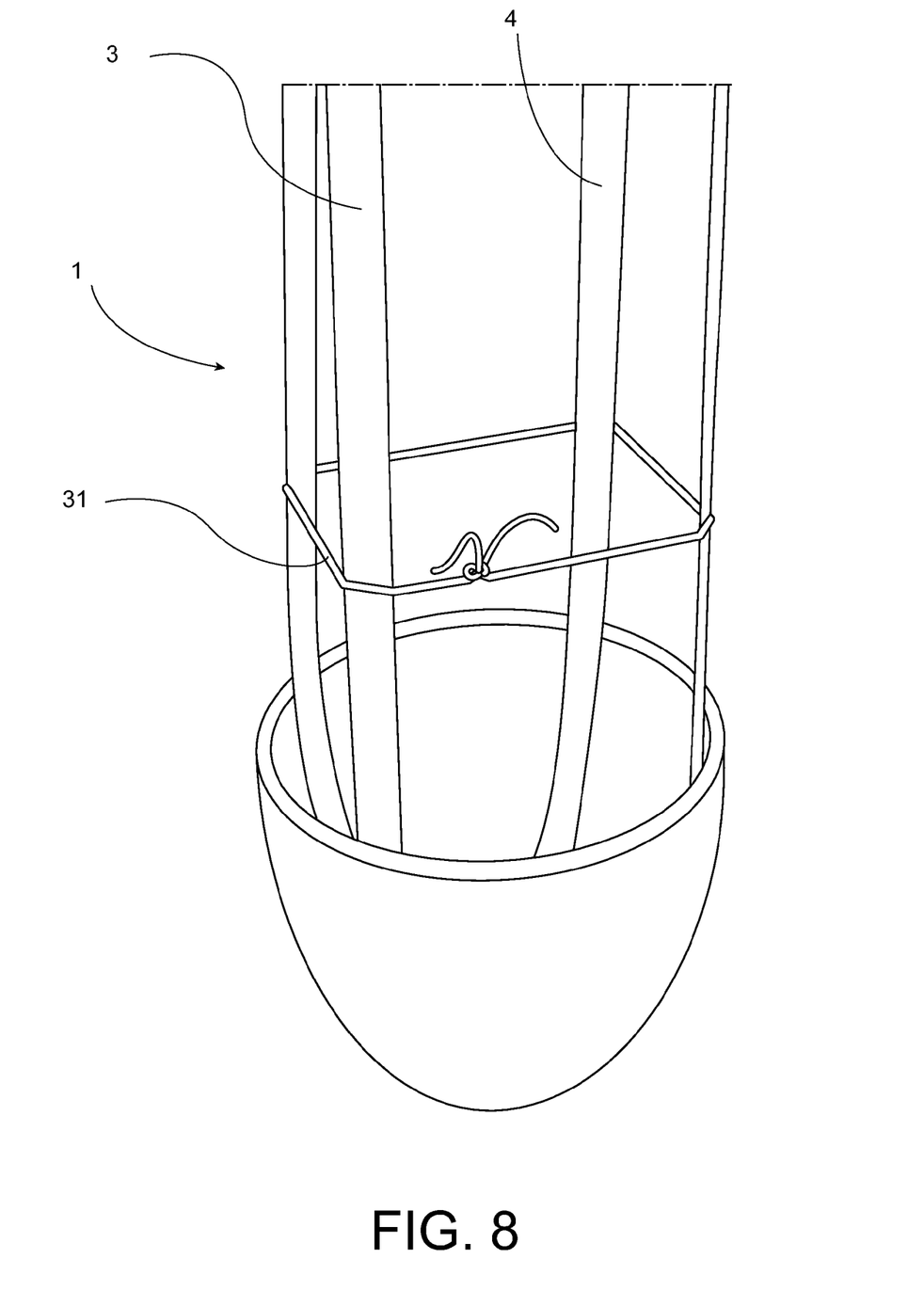
FIG. 8 shows the plant support as in FIG. 1 and FIG. 2 with an additional horizontal member.

As illustrated in FIG. 8, the horizontal looped member 31 may be formed as an inelastic loop of rope or wire which is held in place by spring force of the deformed looped vertical members 3, 4. The horizontal looped member 31 thus need not be separately attached to the vertical looped members 3, 4.

Figure 5:
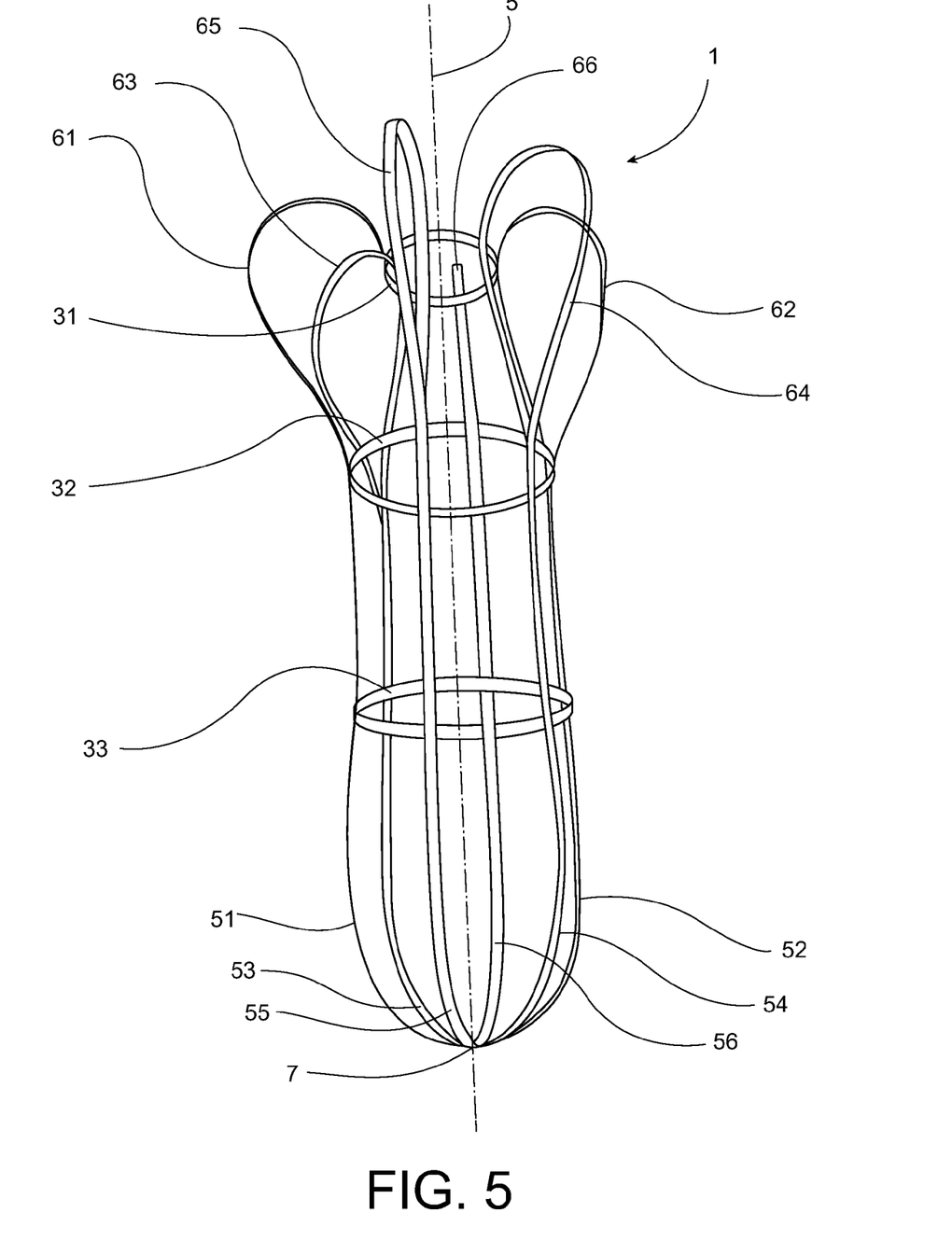
FIG. 5 shows an exemplary plant support with upper looped ends.

Yet another embodiment of a plant support 1 is shown in FIG. 5. Here, six vertical support members 51-56 are arranged circumferentially spaced around a common vertical axis 5. The vertical support members 51-56 are rotated against each other by 60 degrees relative to the vertical axis 5. The vertical support members 51-56 are connected to each other at the lower end 7 of the plant support 1. Two opposite vertical support members 51/52, 53/54, 55/56 may be formed from a single piece of band material.

Figure 6:
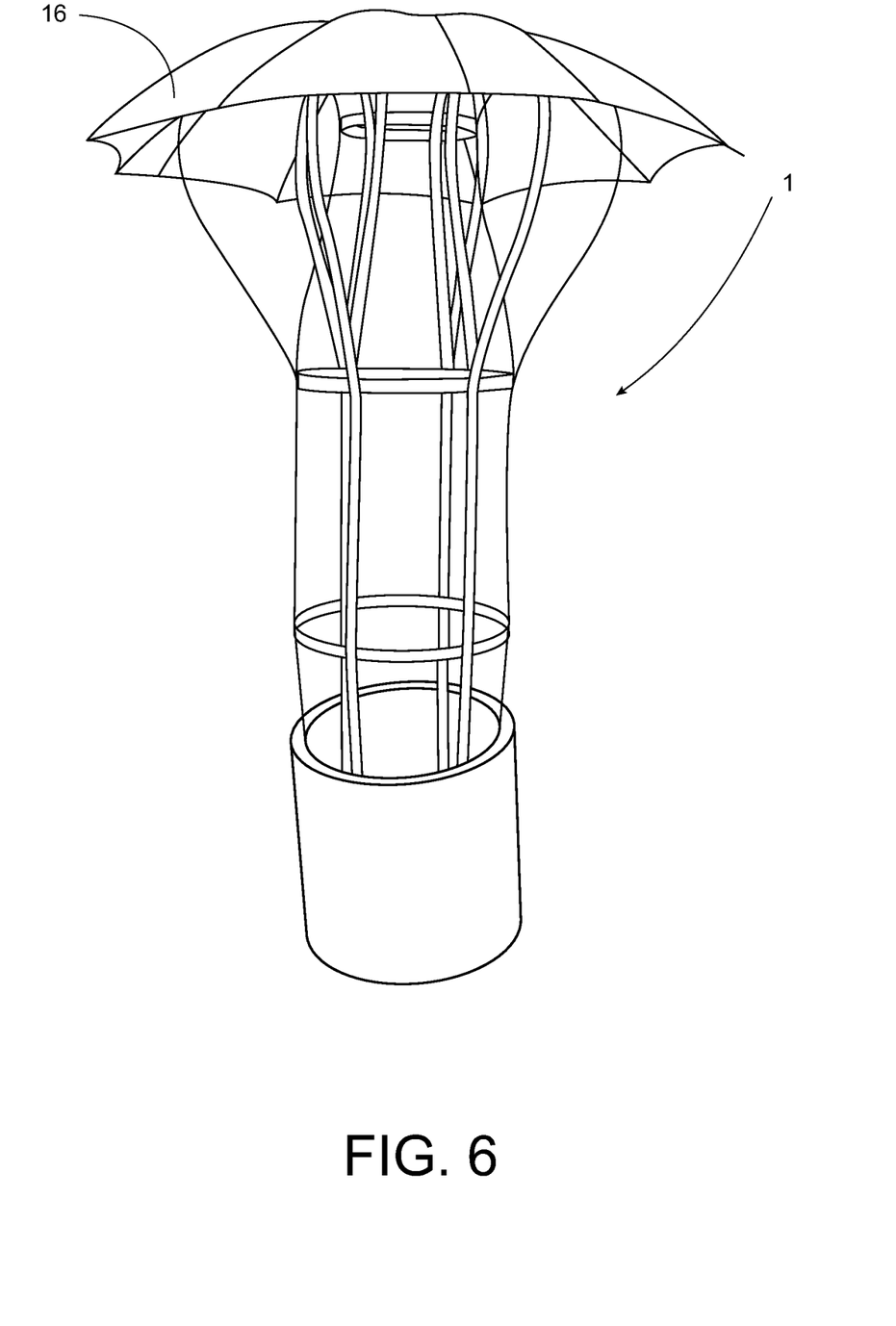
FIG. 6 shows the plant support as in FIG. 6 with a protective device.

Vertically spaced looped horizontal members 31, 32 and 33 are provided and connected to vertical support members 51-56. Each upper end of the vertical support members 51-56 is bent into an upper, outward facing loop 61-66. The inner surfaces of the upper loops 61-66 are connected to each other by the uppermost horizontal support member 31. The upper loops 61-66 provide a support to attach a protective device 16 as shown in FIG. 6, for example a shield to protect sensitive plants from direct sun or rain.

Figure 7:
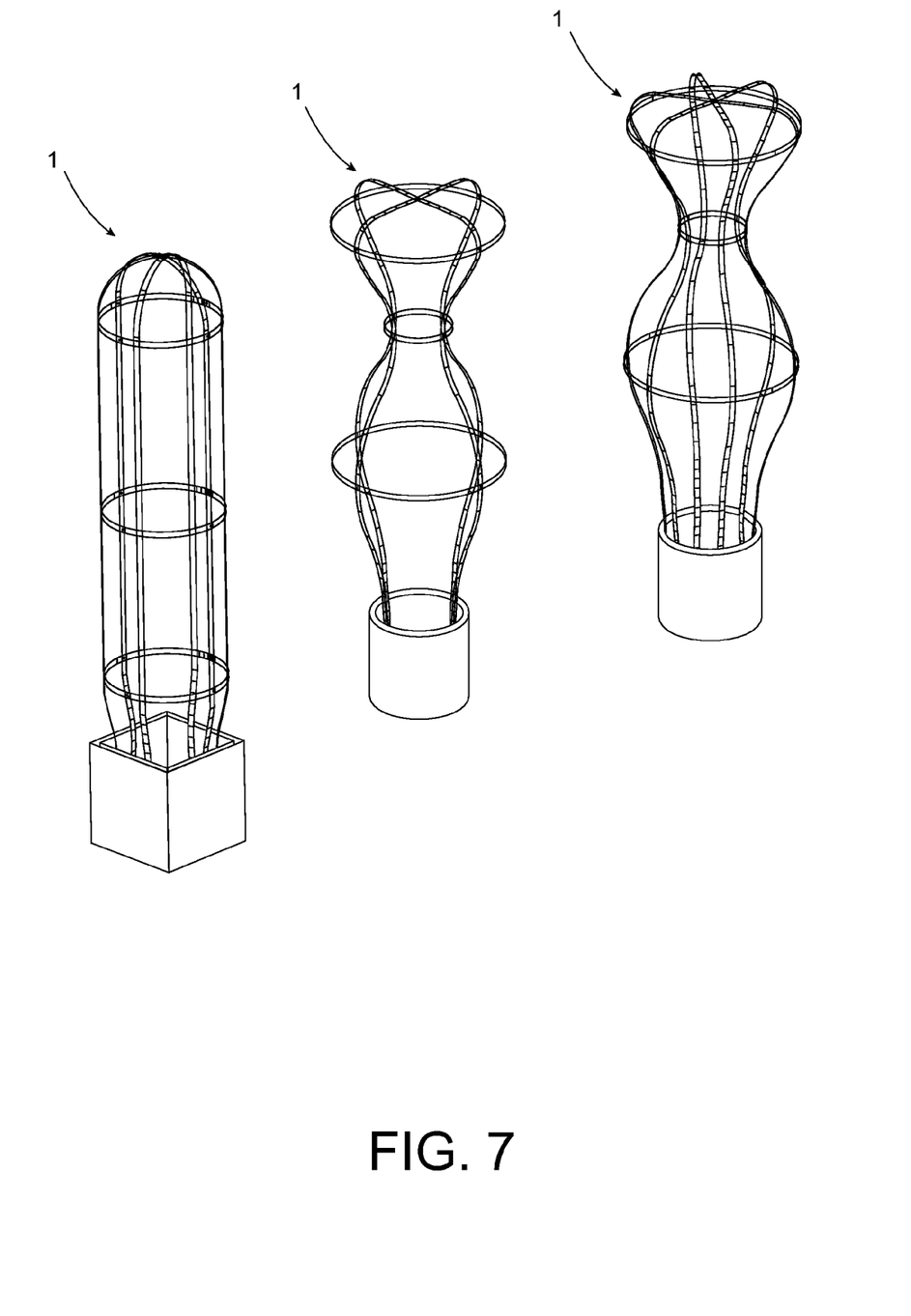
FIG. 7 illustrates three alternative configurations of a plant support.

As shown in FIG. 7, a plant support 1 can be configured with two, three or more elongated vertical members and different number and diameter of horizontal looped members to achieve various shapes of the plant support.

Figure 9:
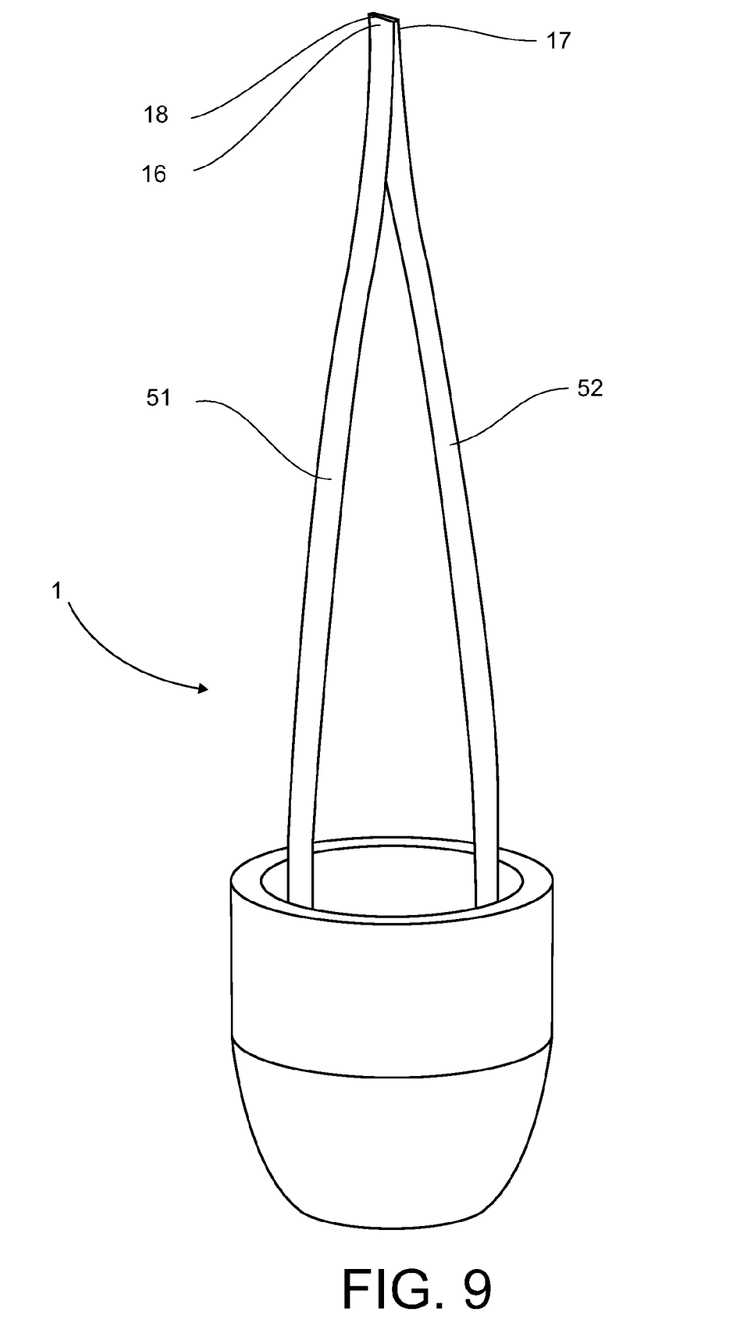
FIG. 9 shows a plant support with two vertical support members.

A basic, substantially tear drop shaped version of the plant support 1 is illustrated in FIG. 9. As shown, the plant support here comprises only two vertical support members, a first vertical support member 51 and a second vertical support member 52. Each of the vertical support members 51, 52 has a lower end and an upper end. The upper end 16 of the first vertical support member 51 is connected to the upper end 17 of the second vertical support member 52 in form of a fold 18. Preferably, the first vertical support member 51 and a second vertical support member 52 are be made from one single piece of band material and folded to form a fold 18 at the upper end 6 of the plant support 1.

Figure 10:
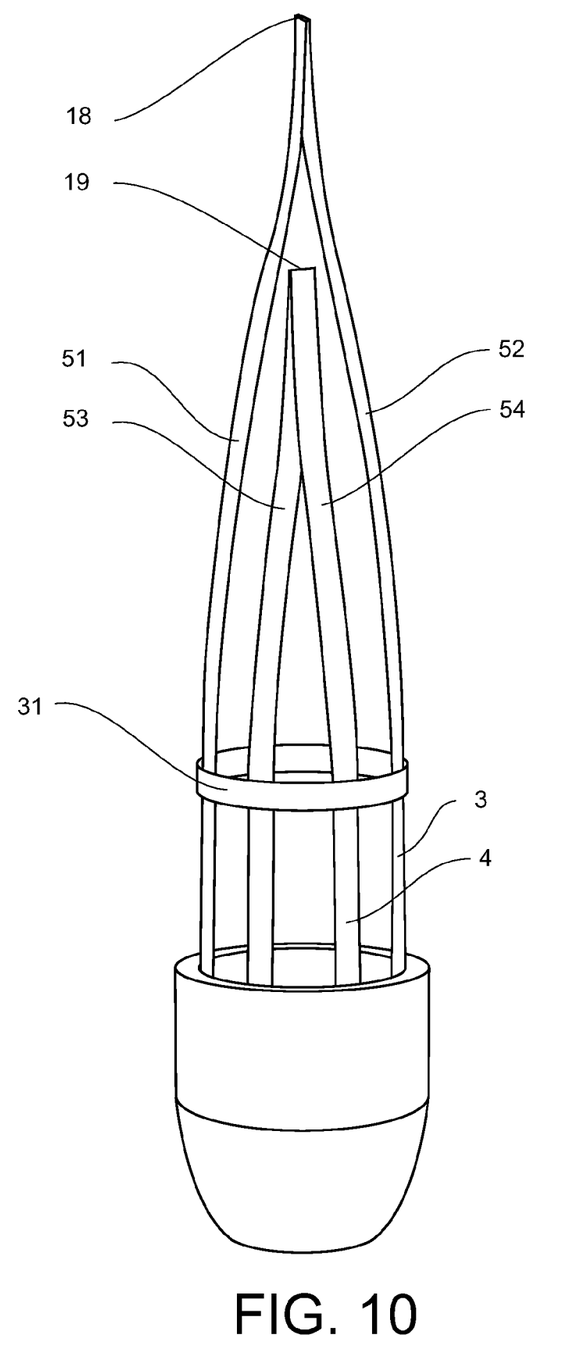
FIG. 10 illustrates a plant support with two interleaved vertically elongated looped members with bent tops.

As shown in FIG. 10, the plant support may comprise two vertically looped members 3, 4 of different heights that are arranged within one another. As shown, a first vertically looped member 3 comprises two vertical support members 51, 52. A second vertically looped member 4 also comprises two vertical support members 53, 54. The four vertical support members 51-54 are circumferentially spaced, with the vertical support members 51, 52 of the first vertically looped member 3 being arranged opposite each other and rotated approximately 90 degrees around their horizontal axis against the vertical support members 53, 54 of the second vertically looped member 4. The folded tip 18 of the first vertically looped member 3 is arranged above the folded tip 19 of the second vertically looped member 4. All four vertical support members 51-54 are connected by a single horizontal looped member 31.

Figure 11:
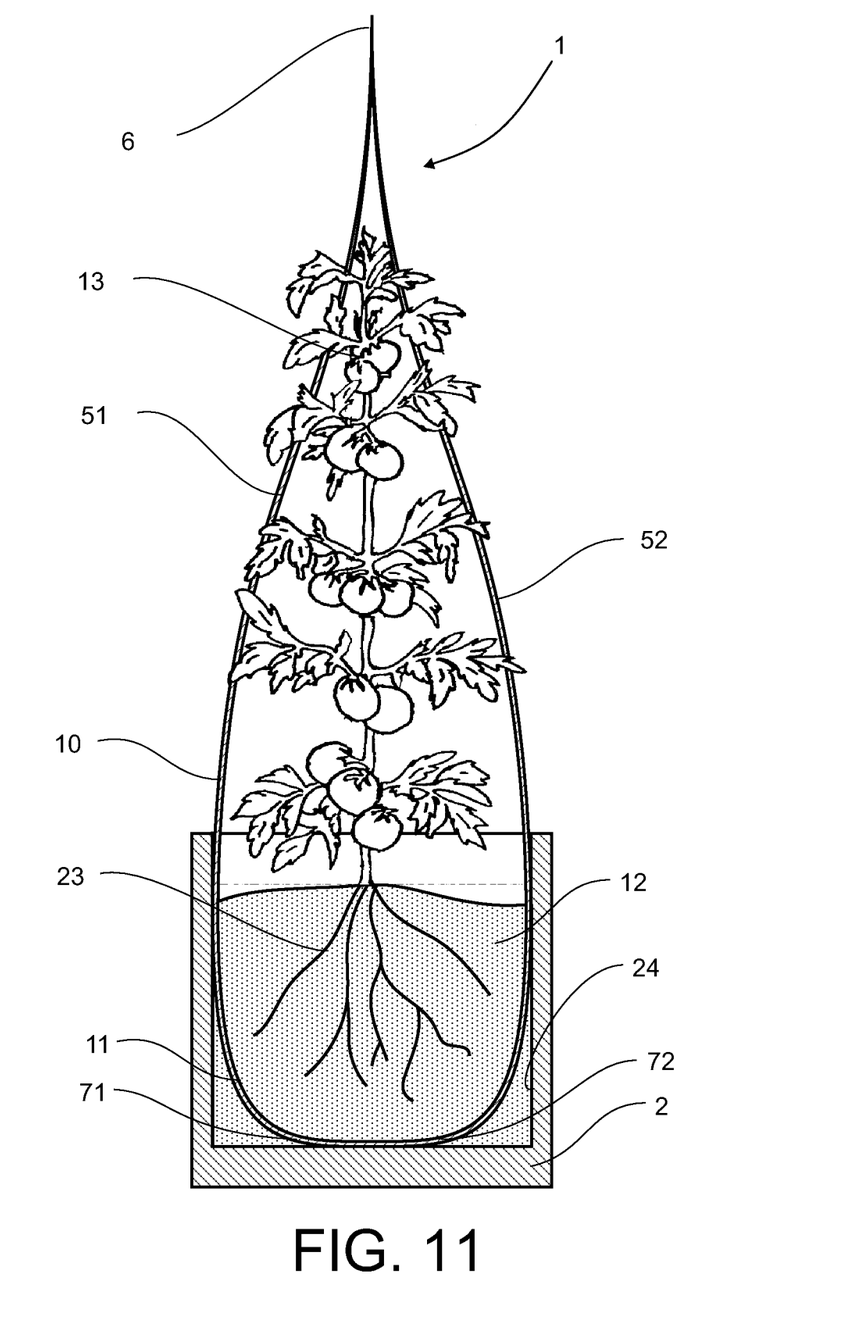
FIG. 11 is a cross-sectional view of a plant support in use.

FIG. 11 illustrates an exemplary system for supporting a plant in a pot, showing a cross-sectional view of a plant support 1 in use. As shown, a plant 13 is arranged in soil 12 between two vertical support members 51, 52. The lower ends 71, 72 of the vertical support members 51, 52 are arranged in the soil 12 below the plant 13 and its roots 23. A lower portion 11 of the plant support 1 is embedded in the soil 12 and an upper portion 10 of the plan support extends substantially vertical above the soil 12. The vertical support members 51, 52 are elastically deformed to push against the inside wall 24 of planting pot 2.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

For example, one skilled in the art will understand that the vertical axis 5 of the plant support 1 need not be oriented in a true vertical, i.e. perpendicular to the ground, but may for example be oriented within an angle of +/−45 degree in respect to the true vertical.

What is claimed is:

1. A plant support, comprising:
    a first vertically elongated looped member made of a elastic band material being formed as a first closed loop having a vertical axis within a first plane, the resilient band material having a uniform cross section along its length which is at least five times wider than it is thick, a wide side of the resilient band material within the first vertically elongated looped member being arranged perpendicular to the first plane;
    a second vertically elongated looped member made of the elastic band material being formed as a second closed loop in a second plane coaxial with the first closed loop, the wide side of the resilient band material within the second vertically elongated looped member being arranged perpendicular to the second plane;
    an upper connecting element arranged within the vertical axis, the upper connecting element rotatably connecting the first vertically elongated looped member with the second vertically elongated looped member at an upper end of the plant support; and
    a lower connecting element arranged within the vertical axis, the lower connecting element rotatably connecting the first vertically elongated looped member with the second vertically elongated looped member at a lower end of the plant support,
    wherein the first vertically elongated looped member and the second vertically elongated looped member can be rotated into a common plane for storage and can be rotated into separate planes for use and
    wherein the plant support is configured to elastically deform and push against an inner wall of a planting pot when in use with said plant.

2. The plant support as in claim 1, wherein a lower portion of the plant support is embedded in soil and an upper portion of the plan support extends above the soil.

3. The plant support as in claim 1, wherein the elastic band material is stainless steel.

4. The plant support as in claim 1, wherein the upper connecting element and the lower connecting element are screws or rivets.

5. The plant support as in claim 1, further comprising one or more horizontal looped members.

6. The plant support as in claim 1, further comprising two or more horizontal looped members having a generally circular shape of the same diameter.

7. The plant support as in claim 1, further comprising
at least one lower horizontal looped member having a generally circular shape and
an upper horizontal looped member having a generally circular shape,
wherein a diameter of the upper horizontal looped members is smaller than a diameter of the lower horizontal looped member.

8. The system as in claim 1, wherein the elastic band material is more than 10 times wider than it is thick.

9. The system as in claim 8, wherein the elastic band material is steel.

10. The system as in claim 1, further comprising a protective device arranged at an upper end of the plan support.

* * * * *